Feb. 23, 1971   J. F. O'NEILL   3,566,253
SWITCHING TYPE REGULATORS HAVING ALTERNATE LOAD CURRENT PATHS
Filed April 1, 1969                                    2 Sheets-Sheet 1

INVENTOR
J. F. O'NEILL
BY Alfred D. Steinmetz
ATTORNEY

Feb. 23, 1971 J. F. O'NEILL 3,566,253
SWITCHING TYPE REGULATORS HAVING ALTERNATE LOAD CURRENT PATHS
Filed April 1, 1969 2 Sheets-Sheet 2

United States Patent Office 3,566,253
Patented Feb. 23, 1971

3,566,253
SWITCHING TYPE REGULATORS HAVING
ALTERNATE LOAD CURRENT PATHS
John F. O'Neil, Eatontown, N.J., assignor to Bell Telephone Laboratories, Incorporated, Murray Hill, N.J., a corporation of New York
Filed Apr. 1, 1969, Ser. No. 812,085
Int. Cl. G05f 1/44
U.S. Cl. 323—22
2 Claims

ABSTRACT OF THE DISCLOSURE

A switching type regulator utilizes two alternate load current paths with independent current level control to reduce the power normally carried by the switching device located in one of the load current paths. The independent control is achieved by magnetically coupling the two load current paths with appropriate winding ratios to achieve the desired current in each of the two paths.

BACKGROUND OF THE INVENTION (1) Field of the invention

This invention relates to power converter systems and more particularly to a switching type power regulator to regulate electrical power.

(2) Description of the prior art

Power regulators are utilized to control the transfer of electrical energy from a source of electrical power to a load circuit using the energy. The regulator transmits the power to the load at a controlled voltage. Hence the voltage at the load is maintained at a substantially constant amplitude despite variations in the load power consumption and the input (source) voltage amplitude.

Most conventional power regulators control the energy transfer from the source to the load by varying a resistance interposed between the source and the load to maintain the voltage applied to the load at a constant level. These power regulators are inefficient, however, because the variable resistance interposed between the source and the load dissipates a considerable portion of the transmitted energy.

Switching type power regulators transmit energy from the source to the load with a higher efficiency than do variable resistance type regulators. The switching type regulator, in order to regulate the voltage of the transmitted energy, periodically disrupts the connection between the energy source and the load. In order to maintain a substantially constant level of power at the load, and to avoid excessive energy losses, switching regulators utilize an energy storage device to continue to supply energy to the load when the connection between the source and the load is disrupted.

The connection between the source and the load typically includes a controlled switching device to periodically disrupt the connection. The power supplied to the load is generally dependent upon the current transmission capacity of the switching device. A switching device widely used in switching regulators is the power transistor. Commercially available power transistors are typically limited, however, in the amount of current that they can transmit. Specially designed power transistors capable of transmitting large amounts of current are generally very expensive. If the average current transmitted by a switching transistor exceeds its rating, heat dissipation therein may destroy the transistor. If the instantaneous current through the switching transistor exceeds its rating, the transistor may also be damaged.

It is therefore an object of the invention to limit the peak and average current handled by the switching device in a switching type regulator without significantly reducing the power output of the regulator.

It is another object of the invention to supply a high constant power level through a switching type regulator while limiting the peak load current transmitted through the switching device to a small proportion of the total load current.

It is yet another object of the invention to control the amount of current transmitted through the switching device in a switching type regulator substantially independently of the power requirements of the load.

SUMMARY OF THE INVENTION

Therefore, in accord with the present invention, a switching type regulator limits the power transmitted through the switching device by utilizing a separate energy path magnetically coupled to the energy path including the switching device. By independently controlling the current level in each energy path, the peak and average currents transmitted by the switching device are significantly reduced without correspondingly reducing the power output of the switching type regulator.

In one embodiment of the invention, utilizing a switching transistor, energy is both stored and delivered to the load while the switching transistor is conducting, and delivered by a separate path to the load when the switching transistor is cut off. The energy storage device comprises two closely coupled coil windings which are connected on the opposite sides of the collector-emitter path of the switching transistor. A diode coupled to one of the coils limits the current therein to one direction. The switching transistor is alternately switched into a conducting and a nonconducting condition in response to a duty cycle control which controls the switching action to maintain the regulated output voltage at a substantially constant magnitude. When the transistor is conducting, energy is stored via the coil in the transistor current path. When the transistor is rendered nonconducting, the energy in the magnetic field is available in the other coil and is released as a load current through the diode. Hence, the load current flows through the switching transistor and the diode at alternate time periods.

The selection of a winding ratio of the two coils permits an independent adjustment of the load currents which flow through the transistor and the diode respectively. Accordingly, the switching transistor need conduct only a small current whereas the average value of the two alternate load currents is sufficient to maintain the total output load current at a substantially fixed level greater than the current conducted by the transistor. Because only a small load current flows through the transistor each cycle, a lower current and power capacity switching transistor may be safey utilized in the regulator as compared with conventional single-coil switching type regulators of comparable output.

BRIEF DESCRIPTION OF THE DRAWINGS

Many advantages, features and additional objects of the invention will become readily apparent with reference to the following detailed description and the accompanying drawings in which.

DETAILED DESCRIPTION

Figure 1:
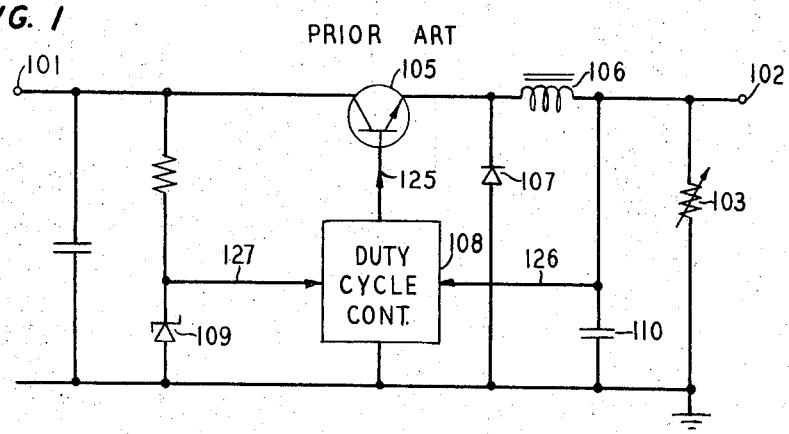
FIG. 1 is a schematic diagram of a conventional switching type power regulator commonly found in the prior art.

The switching type power regulator shown in FIG. 1 is a typical switching type regulator commonly found in the prior art. An unregulated DC voltage is applied to the input terminal 101. A switching transistor 105, interposed between the input terminal 101 and the output terminal 102, is repeatedly turned on and off in response to control signals applied to its based electrode 125. These control signals are supplied by the duty cycle control 108 which responds to variations in the voltage at the output terminal 102. These voltage variations are coupled to the duty cycle control 108, via lead 126.

When the switching transistor 105 is biased into a conducting condition, energy is coupled from the input terminal 101 to an energy storage device including the reactor. The energy storage device is preferably a magnetic core interval to the coil 106. The coil 106 is, in turn, coupled to the output terminal 102. The current supplied by the source coupled to the input terminal 101 flows through the transistor 105 and the coil 106 to the output load impedance 103. The output load impedance 103, while shown herein as a variable resistor, may comprise any electrical impedance to which it is desirable to supply electrical power at substantially constant voltage. The current flowing through the coil 106 creates a magnetic flux in the core of magnetic material and hence stores energy in the core. The duty cycle control 108 continuously monitors, via lead 126, the output voltage at the output terminal 102.

The aforementioned duty cycle control 108 may comprise any feedback circuitry capable of responding to output voltage variations to generate a control signal to switch the transistor 105. The duty cycle control 108 compares the output voltage to a reference voltage established by a Zener diode 109 which is coupled to the duty cycle control 108, via lead 127.

When the voltage on the output terminal 102 exceeds a predetermined level, the duty cycle control 108 charges the signal to the base electrode 125 of the switching transistor 105, switching it into a nonconducting condition. With the switching transistor 105 in a nonconducting condition, the coil 106 is disconnected from the energy supplied at the input terminal 101. However, due to the energy stored in the magnetic core of the coil 106 the load current continues to flow in the coil 106. Due to the reverse voltage induced in the coil 106 the diode 107 is forward biased. Hence a load current flows through the diode 107, the coil 106, and to the output impedance 103.

The current in the coil 106 decays linearly and consequently the output voltage at the output terminal 102 decays slightly, so that the load filter capacitor 110 must furnish some current. When the output voltage decays below a predetermined threshold, the duty cycle control 108 applies a bias signal to the base electrode 125 switching the switching transistor 105 into its conducting condition. With the switching transistor 105 conducting, power is coupled from the input 101 to the coil 106 and hence the regulation cycle maintains a nearly steady output voltage.

The maximum load current of the regulator disclosed in FIG. 1 is determined by the current transmission capacity of the switching transistor 105. The same load current magnitude is handled by the transistor 105 and the diode 107 respectively, just prior to and just subsequent to the switching operation. This may be readily apprehended by reference to the waveform diagram in FIG. 3A wherein $i_1$ and $i_2$ represent the load current flowing through the transistor 105 and the diode 107, respectively. Of the two load currents $i_1$ and $i_2$, since the peak value $i_Q$ and $i_D$ at time $t_1$ are identical in magnitude, the transistor 105 must have a large current transmission capacity if a large load current is to be supplied to the output impedance 103.

Figure 2:
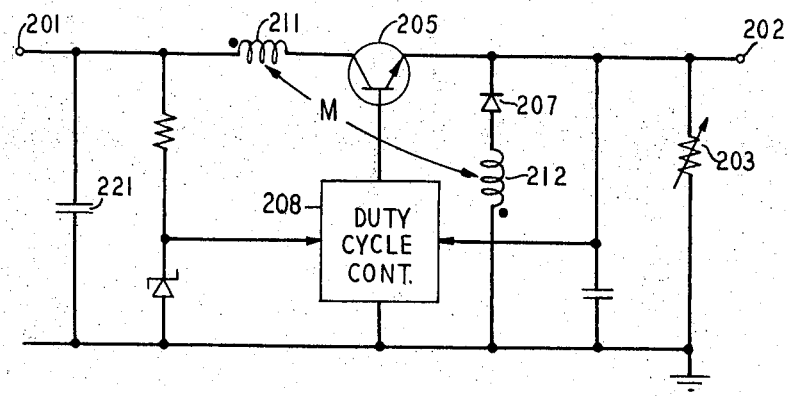
FIGS. 2, 4 and 5 are schematic diagrams of switching type power regulators embodying the principles of applicant's invention.

The switching regulator, disclosed in FIG. 2, is designed in accord with the principals of the invention. This switching regulator supplies a regulated output voltage to the output lead impedance 203 with only a relatively low proportion of the load current being carried by the switching transistor 205. The apportionment of the load currents traversing the transistor 205 and the diode 207 is controlled by varying the winding ratio of two closely coupled coils 211 and 212 which have a common energy storage device such as a magnetic core. The coils 211 and 212 comprise ordinary reactor coils and are wound on the common magnetic core so that each can store or remove energy in terms of the flux in the core. The two coils 211 and 212 convert current to magnetic energy and the magnetic core performs as an energy storage device common to the two coils. The two coils 211 and 212 are closely coupled through the core to facilitate the transfer of energy from one coil to the other.

Figure 3B:
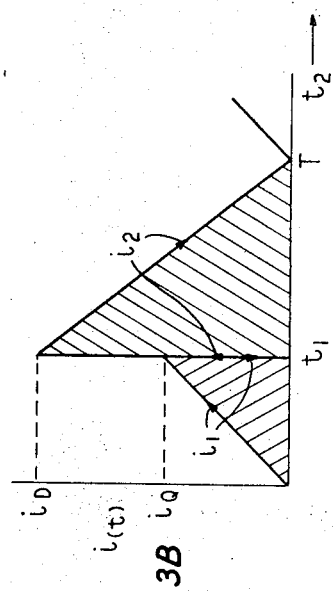
FIGS. 3A and 3B are waveform diagrams of the various load currents in the disclosed switching regulators to explain the operation thereof.
Figure 3A:
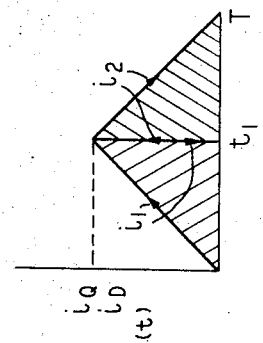

The load current waveforms, shown in FIG. 3B, disclose two unequal sequential load currents $i_1$ and $i_2$ which flow through the coils 211 and 212, respectively. The maximum current level $i_Q$ flowing through the transistor 205 is substantially less than the maximum current level $i_D$ flowing through the diode 207. Hence a substantially large load current may be applied to the output impedance 203 with a switching transistor 205 of only a modest current transmission capacity.

In operation, an unregulated DC voltage is applied to the input terminal 201. A capacitor 221 shunted across ground and the input terminal 201, serves to reduce ripple variations in the DC signal supplied by the source. Assuming that the switching transistor 205 is initially in a conducting condition, a current flows from the input terminal 201 through the coil 211 and the collector-emitter path of the switching transistor 205, to the output load impedance 203. This load current flowing through the switching transistor 205 is the current designated $i_1$ in FIG. 3B. As current begins to flow through the coil 211, the change of flux in the core therein induces a voltage, via magnetic coupling, in the coupled coil 212. The induced voltage in coil 212 reverse biases the diode 207. The reverse biased diode 207 prevents the flow of a load current coil 212. The load current $i_1$ increases in magnitude as shown in FIG. 3B until the transistor 205 ceases conduction at time $t_1$ under control of the duty cycle control 208.

The direction of coupling of the coils 211 and 212 is indicated, in FIG. 2, by the polarity dot notation thereon. This notational method of indicating the direction of coupling of two coupled coils is well known in the art, and it is not believed necessary to describe this notational scheme herein in detail. A description of the polarity dot notation is given, for instance, in Electric Machinery by Fitzgerald and Kingsley (McGraw Hill, 1952) page 648.

The duty cycle control 208 determines the ratio of the time duration during which the transistor 205 is conducting to the time duration during which the transistor 205 is not conducting. The ratio of these times is determined in response to the magnitude of the output voltage at output terminal 202 which is monitored by the duty cycle control 208. The conducting and nonconducting time duration add up to a fixed time interval which is established by timing circuitry included in the duty cycle control 208. At the time $t_1$, as shown in FIG. 3B, the duty cycle control responds to the output voltage to bias the transistor 205 into its nonconducting condition. With the transistor 205 in a nonconducting condition, the load current $i_1$ ceases to flow in the coil 211. The flux established in the magnetic core common to the coils 211 and 212 is continuous, and cannot change instantaneously. In response to the flux in the common core of coils 211 and 212, a reverse voltage is induced in the coil 212. This reverse voltage forward biases the diode 207 and induces a load current in the coil 212 which flows through the diode 207 to the output impedance 203. The load current flowing through the forward biased diode 207 is designated $i_2$ in FIG. 3B. The load current $i_2$ initially is at its high maximum value $i_D$ due to the large initial flux energy transferred, via the magnetic core, from coil 211 to coil 212. As the flux in the core decays subsequent to time $t_1$, the load current $i_2$ also declines in value as shown in FIG. 3B.

The magnitude of the respective load currents $i_1$ and $i_2$ flowing through the switching transistor 205 and the diode 207 may be independently varied by varying the turns ratio of the coil windings on the coupled coils 211 and 212. By reducing the number of turns in the coil 212 to be considerably less than the number of turns in the coil 211, and load current $i_2$ conducted through the diode 207 is considerably greater in magnitude than the load current $i_1$ conducted through the switching transistor 205.

It is readily apparent from the foregoing that a high average load current may be supplied to the output impedance 203 without subjecting the switching transistor 205 to high current loads. For example, as shown in FIG. 3B, the maximum current $i_Q$, conducted by the transistor 205, is considerably less than the maximum current $i_D$, conducted by the diode 207. Inasmuch as the switching action control of the duty cycle control 208 operates identically with the switching action control of the duty cycle control 108 shown in FIG. 1, it is not believed necessary to describe the switching action control in detail.

Figure 4:
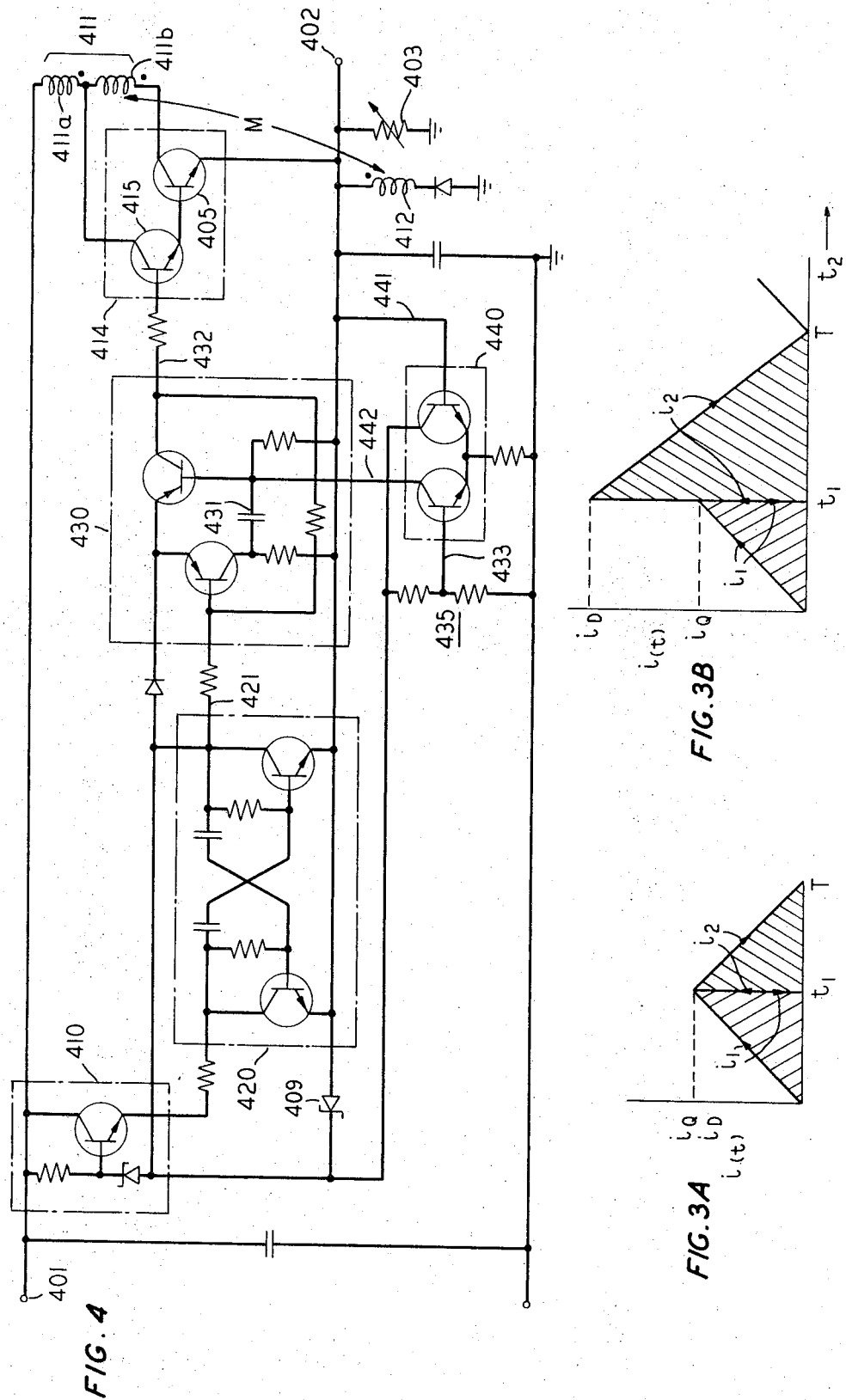

A detailed schematic diagram of a switching type regulator including the circuit details of a suitable duty cycle control for use in the invention is disclosed in FIG. 4. Energy from an unregulated voltage source is applied to the input terminal 401. The transmission of this energy to the output terminal 402 and the output load impedance 403 is controlled by a semiconductor switching device 414.

The switching device 414 comprises the compound connected transistors 405 and 415. The coil 411 is tapped and divided into two coil segments 411a and 411b. The coil segment 411b separates the collector electrodes of the two transistors 405 and 415. This coil segment 411b induces a positive voltage in the collector junction of transistor 415 to improve its gain characteristic. This permits the two transistors to multiply their respective current gains, which reduces the input drive current required, and hence the power efficiency of the compound connection is considerably improved. The load currents are divided between the two coils 411 and 412 in the same manner as is described hereinabove, with reference to the regulator disclosed in FIG. 2.

The duty cycle control comprises an astable multivibrator 420, a controlled monostable pulse generator 430, and a differential amplifier 440. The astable multivibrator 420 is energized by a constant current source 410. The constant current source 410 additionally controls the current flow through the voltage regulator diode 411. The constant current source 410 is, in turn, energized by the input power applied by an unregulated source to the input terminal 401. The astable multivibrator 420 in response to the constant voltage drop across the regulator diode 411, generates a pulse train of short duration pulses. This pulse train is applied, via lead 421, to the monostable pulse generator 430.

The monostable pulse generator 430 generates an output pulse of controlled duration in response to each input pulse applied, via lead 421. The duration of each of these pulses is controlled by the differential amplier 440 which applies a duration control bias signal via lead 442 to the monostable pulse generator 430. The differential amplifier 440 is coupled, via lead 441 to the output terminal 402, and, via lead 433, to the voltage divider 435, which is energized by the constant current source 410. Variations in the voltage level at the output terminal 402 alter the control bias signal output of the differential amplifier 440. The bias signal output of the differential amplifier 440 is coupled, via lead 442, to the timing capacitor 431 of the monostable pulse generator 430. The magnitude of the output voltage controls, through the differential amplifier 440, the duration of the pulse output of the monostable pulse generator 430.

The pulse output of the monostable pulse generator 430 is coupled, via lead 432, to the base electrode of the transistor 415. This pulse output signal is utilized to bias the switching device 414, comprising the compound connected transistors 415 and 405, into conduction. The duration of the pulse output of the monostable pulse generator 430 controls the duty cycle of the switching device 414.

The overall operation of the switching regulator disclosed in FIG. 4 is identical to the operation of the switching regulator disclosed in FIG. 2, and hence it is not believed necessary to discuss it herein in detail.

Figure 5:
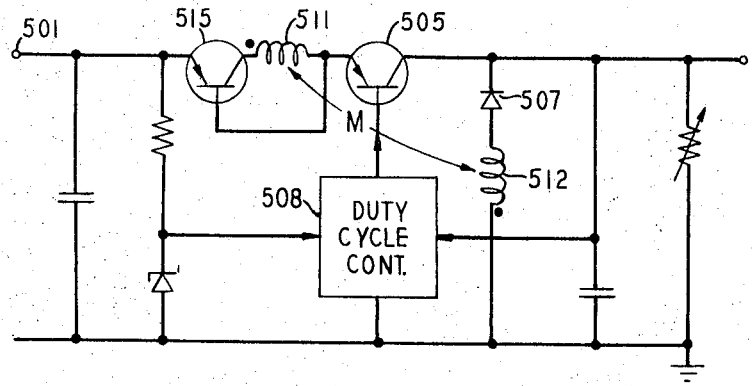

An alternative switching regulator circuit embodying the principles of the invention is shown in FIG. 5. The switching device in the regulator disclosed in FIG. 5 comprises two cascaded switching transistors 505 and 515. This cascading arrangement reduces the voltage drop to which each of the individual switching transistors 505 and 515 is subjected.

The bias control signal output of the duty cycle control 508 is connected only to the switching transistor 505. The switching transistor 505, corresponding to the switching transistor 205 in FIG. 2, is repeatedly biased into its conducting and nonconducting condition in response to the duty cycle control 508 in the same manner as described hereinabove with reference to the operation of the regulator disclosed in FIG. 2. The added switching transistor 515 has been interposed between the input terminal 501 and the switching transistor 505. This added switching transistor 515 absorbs part of the voltage drop carried by the switching device, and hence reduces the voltage breakdown tolerance necessary for the individual switching transistors 505 and 515.

The base and collector electrodes of the transistor 515 are connected to opposite terminals of the coil 511. With a load current flowing through the coil 511, the transistor 515 is biased into conduction. When the transistor 505 is initially cut off, the reverse voltage in the coil 511 biases the switching transistor 515 into a nonconducting condition. When the transistor 505 resumes coduction the transistor 515 is again biased into conduction. It is therefore apparent that the switching transistors 515 and 505 both switch in harmony into their conducting and nonconducting states.

I claim:
1. A switching type regulator comprising input terminals to accept a voltage to be regulated, output terminals to which a load may be connected, a ground voltage, switching means interconnecting said input and output terminals including first and second switching transistors, a first coil winding, a second coil winding magnetically coupled to said first coil winding and having a winding orientation opposite to that of said first coil winding, a diode connected to said second coil winding to limit current flow therein to one direction, said first and second switching transistors oriented to conduct current in a direction opposite to said one direction, the collector-emitter path of said first switching transistor interconnecting said input terminal to one end of said first coil winding, the control electrode of said first switching transistor being connected to the opposite end of said first coil winding, the collector-emitter path of said second switching transistor interconnecting said opposite end of said first coil winding to a junction of one end of said second coil winding and said output terminal, the opposite end of said second coil winding being coupled to said ground voltage, control means to periodically switch said second switching transistor into conducting and nonconducting states in response to the voltage at said output terminals whereby said first and second coil windings alternately conduct a current to said output circuit and said first coil winding in response to said alternately conducting current supplies switching signals to the control electrode of said first switching transistor.

2. A switching regulator as defined in claim 1 wherein said control means includes a reference voltage source connected to said ground voltage and wherein the number of turns in said first coil winding is substantially greater than the number of turns in said second coil winding whereby the current supplied to the output terminal via said second coil winding is substantially greater than the current supplied to the output terminals via said first and second switching transistors.

References Cited

UNITED STATES PATENTS

| | | | |
|---|---|---|---|
| 3,093,790 | 6/1963 | Ehret | 323—22(T) |
| 3,229,194 | 1/1966 | Mills | 323—22(T) |
| 3,328,674 | 6/1967 | Bleicher | 323—22(T) |
| 3,368,139 | 2/1968 | Wuerflein | 323—22(T) |
| 3,417,321 | 12/1968 | Clapp | 323—22(T) |
| 3,461,377 | 8/1969 | Reese | 323—22(T) |

J. D. MILLER, Primary Examiner

G. GOLDBERG, Assistant Examiner

U.S. Cl. X.R.

323—38